United States Patent
Metropoulos (10) Patent No.: US 12,097,545 B2
(45) Date of Patent: Sep. 24, 2024

(54) METHOD FOR EFFICIENT COLLECTION AND DESTRUCTION OF PLASTIC WASTE IN BODIES OF WATER

(71) Applicant: Peter Metropoulos, Manhattan Beach, CA (US)

(72) Inventor: Peter Metropoulos, Manhattan Beach, CA (US)

(*) Notice: Subject to any disclaimer, the term of this patent is extended or adjusted under 35 U.S.C. 154(b) by 195 days.

(21) Appl. No.: 17/533,913

(22) Filed: Nov. 23, 2021

(65) Prior Publication Data
US 2022/0161303 A1      May 26, 2022

Related U.S. Application Data

(60) Provisional application No. 63/117,575, filed on Nov. 24, 2020.

(51) Int. Cl.
*B09B 3/70* (2022.01)
*B09B 3/40* (2022.01)
*B09B 101/75* (2022.01)

(52) U.S. Cl.
CPC ............... *B09B 3/70* (2022.01); *B09B 3/40* (2022.01); *B09B 2101/75* (2022.01)

(58) Field of Classification Search
CPC .......... B09B 3/70; B09B 3/40; B09B 2101/75
USPC ......................................... 588/321
See application file for complete search history.

(56) References Cited

FOREIGN PATENT DOCUMENTS

| CN | 110434148 A | * | 11/2019 |
| CN | 112371689 A | * | 2/2021 |

* cited by examiner

*Primary Examiner* — Edward M Johnson
(74) *Attorney, Agent, or Firm* — Workman Nydegger (57) ABSTRACT

Methods and systems for the efficient collection and destruction of plastic waste and debris found in bodies of water, such as oceans. In particular, a plastic destruction system can include an insulated chamber having a base containing a heat source and an air source, a bed of a fluidizable media supported above the base, a support tray suspended in the insulated chamber above the fluidizable media, and a humidification compartment located outside of and connected to the insulated chamber to humidify the plastic waste before it enters the insulated chamber. Systems and methods can also utilize a salt wash station to apply a salt solution to the waste for enhanced reaction in the insulated chamber.

20 Claims, 5 Drawing Sheets

METHOD FOR EFFICIENT COLLECTION AND DESTRUCTION OF PLASTIC WASTE IN BODIES OF WATER

CROSS REFERENCE TO RELATED APPLICATION

This application claims the benefit of U.S. Provisional Application No. 63/117,575, filed Nov. 24, 2021, which is incorporated herein by reference in its entirety.

BACKGROUND

Technical Field

This disclosure generally relates to the destruction of plastic waste in bodies of water. More specifically, the present disclosure relates to a method of collection and destruction of plastic waste in the ocean, and other moistened plastic wastes.

Related Technology

Plastic pollution is the accumulation of plastic objects in the earth's environment, particular in bodies of water such as oceans and lakes. Such accumulation adversely affects wildlife and wildlife habitats, as well as human quality of life. Plastics are inexpensive and durable, and as a result, plastic production and use continues to increase worldwide.

The chemical structure of most plastics renders them resistant to many natural processes of degradation and as a result they are very slow to decay. Between 1950 to 2018, about 6.3 billion tons of plastic have been produced worldwide; however, only about 9% of this has been successfully recycled and only 12% has been incinerated. Compounding this problem is the fact that more than 50% of the plastics currently in production are designed for single use and discarded after use, further contributing to the world's plastic waste problem.

Recently, there has been rising alarm due to the growth of enormous floating plastic patches, which exist in all oceans. The largest is the Great Pacific Garbage Patch located between Hawaii and California. It is estimated to contain 80,000 tons of plastic and is reportedly the size of Texas. Current estimates place the amount of floating plastic worldwide at 1.8 trillion tons. The plastic patches contain bits of plastic that can persist for years, if not decades. While there are efforts by states on the West Coast of the United States and Canada to curtail the use and disposal of plastics into the ocean, the amount dumped into the ocean remains vast and is likely to persist indefinitely. Over 90% of plastics in the Pacific Ocean are emitted by countries in Asia, rendering efforts by the U.S. and Canada to curtail plastic dumping essentially meaningless. Because of the enormity of the floating plastic islands, there currently exists no technology capable of eradicating the waste.

Fact finding organizations have removed floating plastic to document the problem, but the amount removed is trivial. The rate of such removal is less than the rate of plastics being emitted. Moreover, hauling recovered plastic waste to land to be disposed of in landfills or incinerated would be prohibitively expensive and involve the use of vast amounts of fuel to collect and transport the plastic waste. In addition, incineration of plastics can produce toxic gases, making it nearly impossible to justify incineration near populated and/or environmentally sensitive coastal regions.

BRIEF SUMMARY

Disclosed are methods and systems for the efficient collection and destruction of plastic debris found in bodies of water, such as oceans. In some embodiments, methods and systems utilize existing plastic collection systems by barges and ships in combination with a plastic destruction system, which can be located on a barge or ship involved in the collection and destruction of waste plastic.

The plastic destruction system is configured to efficiently destroy waste plastic by a catalytic system that efficiently digests and oxidizes the plastic to carbon dioxide and water, typically utilizing thermal energy released by the plastic when oxidized to keep the process going with minimal input of external thermal energy. In some embodiments, the input of external thermal energy is only required to initiate the digesting and oxidation process, after which the process can be essentially self-sustaining as long as a sufficient quantity of waste plastic is fed into the plastic destruction system to provide fuel for the system.

The plastic destruction system utilizes a bed of fluidizable media, such as fluidized silica particles, moisture, heat, and air to generate a highly oxidative environment into which recovered plastic debris is placed in order to convert and destroy the plastic debris into primarily carbon dioxide and water. The moisture provided by the recovered plastic debris advantageously interacts with the fluidizable media and oxygen to create a highly oxidative environment containing hydroxyl radicals, which efficiently and thoroughly digest and oxidize the plastic into carbon dioxide and water.

In addition, dissolved salts and metals contained in sea water can further catalyze the production of hydroxyl radicals capable of rapidly and completely destroying the plastic wastes. Even plastics that have partially dried will retain a greater quantity of surface water as a result of the hygroscopic nature of salts deposited on the plastic surfaces when recovered from the ocean. Salts and/or salty water or brine can be applied to plastic recovered from fresh water to achieve the same purpose. Finally, heat produced while oxidatively destroying the plastic waste can sustain the process without continuous input of heat, such as from fossil fuels.

It is envisioned that one or more plastic destroying reactors containing fluidizable media designed to produce the highly oxidative environment can be placed on barges that have nets, pumps, filters, and/or other systems for recovering floating plastic debris from bodies of water and separating it from the water. The floating plastic debris is collected and separated from the water, yielding a stream of concentrated plastic debris that will typically still contain residual moisture (e.g., from 0.1% to 10% water). The stream of moist plastic debris can be fed continuously or batch-wise into the one or more plastic destroying reactors, where the highly oxidative environment of hydroxyl radicals efficiently digests and destroys the plastic, converting it into mainly carbon dioxide and water (the typical products produced during combustion of hydrocarbons).

Water separated from the plastic is returned to the body of water. In some cases, water that contains microscopic pieces that pass through coarser filtration systems to recover the bulk of the plastic can be further passes through finer filters to remove microscopic pieces before the further filtered water is returned to the body of water. The filter cake of further recovered plastic pieces can be sent to the plastic destroying reactors for digestion and destruction.

A reactor can include a reaction chamber comprised of a base or bottom equipped with a heat source and an air source, a bed of a fluidizable media supported above the base, and means for conveying the plastic debris into the chamber. Fuel or other sources of heat can initially heat the air, moisture, and fluidizable media to generate a highly oxidative atmosphere within the reaction chamber containing hydroxyl radicals and other oxidative species. The plastic waste introduced into the reaction chamber is oxidatively digested and destroyed by the highly oxidative atmosphere, producing carbon dioxide, water, and heat. This continuously regenerates the highly oxidative atmosphere and heat required to maintain the process. From time to time it may be desirable or necessary to introduce supplemental heat to maintain the highly oxidative atmosphere within the reaction chamber. Exhaust gases can be scrubbed using means known in the art for reducing or removing pollutants. Heat generated by the reactor can be used to co-generate power, such as by driving steam turbines, to operate collection and separation apparatus, such as pumps, filters, centrifuges, pre-heaters, and the like.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

Additional features and advantages of the disclosure will be set forth in the description which follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims or may be learned by the practice of the disclosure as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. It is appreciated that these drawings depict only typical embodiments of the disclosure and are not therefore to be considered to be limiting of its scope. The disclosure will be described and explained with additional specificity and detail through the use of the accompanying drawings in which.

DETAILED DESCRIPTION

Before describing various embodiments of the present disclosure in detail, it is to be understood that this disclosure is not limited to the parameters of the particularly exemplified systems, methods, apparatus, products, processes, and/or kits, which may, of course, vary. Thus, while certain embodiments of the present disclosure will be described in detail, with reference to specific configurations, parameters, components, elements, etc., the descriptions are illustrative and are not to be construed as limiting the scope of the claimed invention. In addition, the terminology used herein is for the purpose of describing the embodiments and is not necessarily intended to limit the scope of the claimed invention.

In the drawings, multiple instances of an element may each include separate letters appended to the element number. For example, two instances of a particular element "100" may be labeled as "100a" and "100b." In that case, the element label may be used without an appended letter (e.g., "100") to generally refer to every instance of the element, while the element label will include an appended letter (e.g., "100a") to refer to a specific instance of the element. Similarly, a drawing number may include separate letters appended thereto. For example, FIG. 2 may include FIG. 2A and FIG. 2B. In that case, the drawing number may be used without the appended letter (e.g., FIG. 2) to generally refer to every instance of the drawing, while the drawing label will include an appended letter (e.g., FIG. 2A) to refer to a specific instance of the drawing.

Furthermore, it is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

In addition, unless otherwise indicated, numbers expressing quantities, constituents, distances, or other measurements used in the specification and claims are to be understood as being modified by the term "about," as that term is defined herein. Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Any headings and subheadings used herein are for organizational purposes only and are not meant to be used to limit the scope of the description or the claims.

Overview of System and Methods for the Destruction of Plastic Waste

The term "marine debris" has been used for over 30 years to refer to man-made materials that have been discarded or lost into the ocean. Marine debris encompasses a variety of man-made materials, though plastics make up the majority. About 8 million tons of plastic waste is dumped into the earth's oceans annually. Additionally, it is estimated that 1.15 to 2.41 million tons of plastic are entering the oceans each year from rivers. More than half of this plastic is less dense than sea water, meaning that it will not sink once it reaches the oceans. These buoyant plastics can be carried over extended distances and persist at the sea surface. Some researchers suggest that by 2050, the weight of plastic in the oceans could literally outweigh the fish.

There are five massive plastic patches in the oceans around the world. In the Pacific Ocean, the Great Pacific Garbage Patch (GPGP) covers an estimated surface area of 1.6 million square kilometers, an area twice the size of Texas, and contains over 80,000 tons of plastic. The GPGP is the product of converging ocean currents carrying plastics from around the world. Plastic in the GPGP has been measured since the 1970's and calculations from subsequent years show that microplastic mass concentration in the GPGP is increasing; essentially, the input of plastic to the GPGP is greater than the output. Unless the sources of plastic are mitigated or plastic is removed from the GPGP, this number will continue to rise.

Marine debris can be very harmful to marine life. For example, loggerhead turtles often mistake plastic bags for jellyfish, their favorite food. Albatross mistake plastic resin pellets for fish eggs and feed them to their chicks, which ultimately die of starvation or ruptured organs. Seals and other marine mammals are at risk of becoming entangled in discarded fishing nets and often drown as a result. Marine debris can also disrupt food webs in their respective ecosystems. As microplastics and other trash collect on or near the surface of the ocean, they block sunlight from reaching plankton or algae below. Algae and plankton are common autotrophs in marine ecosystems, meaning they can produce their own nutrients from oxygen, carbon, and sunlight. When algae and plankton are threatened, the entire food chain, including apex predators like sharks, tuna, and whales are threatened as well. According to the National Oceanographic and Atmospheric Administration (NOAA), plastic debris kills an estimated 100,000 marine mammals annually, as well as millions of birds and fish. As a result of marine population decline, seafood becomes less available and more expensive, impacting human consumption.

This food shortage problem is compounded by the fact that plastics both leach out and absorb harmful pollutants. As plastics break down through photodegradation, they leach out colorants and chemicals such as bisphenol A (BPA), which have been linked to environmental and health problems. Conversely, plastics can absorb pollutants, such as polychlorinated biphenyls (PCBs) from the sea water. These chemicals enter the food chain when they are consumed by marine life, and which can then be consumed by humans.

The growing problem of plastic pollution has spurred a number of methods for removal of marine debris. These inventions include trash collecting buckets and lines of sweeping or collection devices. However, the problem remains with what to do with the collected trash once it is removed from the ocean.

The majority, about 79%, of collected plastics end up in landfills or sloughing off in the natural environment as litter and, at some point, end up back in the oceans. If the present trend continues there will be 12 billion metric tons of plastic in landfills by 2050. To combat this problem, scientists and waste management professionals have implemented methods to breakdown and decrease the volume of plastic waste.

Many of the current processes for breaking down plastic waste are costly, time consuming, and emit harmful by-products. Conventional methods of waste disposal involve incineration, where trash is burned at a high temperature and the ash is placed in landfills. First, waste must be collected and transported to incineration facilities. This process alone requires numerous man hours and substantial amounts of fossil fuels to transport the waste, particularly waste removed from oceans and bodies of water which must be transported to inland facilities. While this process decreases the volume of waste, the emissions and ash resulting from conventional incineration are extremely dangerous. If not properly controlled, they cause air pollution that can have dangerous effects on human health and contribute to climate change. Furthermore, incineration facilities are expensive due to the materials required, and the number of skilled workers required to operate the incinerator and supervise the process. The current incineration process has not caught up in speed and economic efficiency to the rate at which humans are producing plastic waste. New incineration methods are needed to address this problem.

Abbreviated List of Defined Terms

To assist in understanding the scope and content of the foregoing and forthcoming written description and appended claims, a select few terms are defined directly below.

As used herein, the terms "activate" and "activated" are meant to refer to a condition in which the fluidizable media are able to produce a reaction or reactive atmosphere of hydroxyl radicals and other reactive species capable of degrading plastic waste and other forms of waste typically found in landfills and the earth's oceans.

The term "insulated chamber," as used herein is intended to be understood as including any apparatus capable of containing a fluidizable media, and that provides appropriate conditions for facilitating the formation of a reaction that produces hydroxyl radicals and other reactive species capable of degrading waste, particularly plastic waste.

The terms "degrade", or "degradation" refer to processes by which materials are at least partially broken down or eliminated to yield lesser substances. It includes complete combustion of gasses into carbon dioxide, water, and other reaction products. It also includes any reaction in which CO, $CO_2$, carbon or hydrocarbons are converted into other, less polluting forms of carbon or other substances.

The term "waste" as used herein is intended to be understood as including trash predominantly found in landfills and trash characterized as marine debris, primarily plastics. The system of the present disclosure is primarily directed to the destruction of plastic waste, however, it should be understood that the process of trash collection may allow a number of materials to mix with the plastic waste, and absent perfect sorting of materials, one would naturally find metals, glass, and/or paper products mixed in with the plastic waste.

The terms "salt-saturated" and "salt-coated" as used herein is intended to be understood as including marine debris which has absorbed or has been coated with salt by its presence in and collection from bodies of salt water.

Unless defined otherwise, all technical and scientific terms used herein have the same meaning as commonly understood by one of ordinary skill in the art to which the present disclosure pertains.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

As used throughout this application the words "can" and "may" are used in a permissive sense (i.e., meaning having the potential to), rather than the mandatory sense (i.e., meaning must). Additionally, the terms "including," "having," "involving," "containing," "characterized by," as well as variants thereof (e.g., "includes," "has," "involves," "contains," etc.), and similar terms as used herein, including within the claims, shall be inclusive and/or open-ended, shall have the same meaning as the word "comprising" and variants thereof (e.g., "comprise" and "comprises"), and do not exclude additional un-recited elements or method steps, illustratively.

It will be noted that, as used in this specification and the appended claims, the singular forms "a," "an" and "the" include plural referents unless the context clearly dictates otherwise. Thus, for example, reference to a singular referent (e.g., "widget") includes one, two, or more referents. Similarly, reference to a plurality of referents should be interpreted as comprising a single referent and/or a plurality of referents unless the content and/or context clearly dictate otherwise. For example, reference to referents in the plural form (e.g., "widgets") does not necessarily require a plurality of such referents. Instead, it will be appreciated that independent of the inferred number of referents, one or more referents are contemplated herein unless stated otherwise.

As used herein, directional terms, such as "top," "bottom," "left," "right," "up," "down," "upper," "lower," "proximal," "distal" and the like are used herein solely to indicate relative directions and are not otherwise intended to limit the scope of the disclosure and/or claimed invention.

To facilitate understanding, like reference numerals (i.e., like numbering of components and/or elements) have been used, where possible, to designate like elements common to the figures. Specifically, in the exemplary embodiments illustrated in the figures, like structures, or structures with like functions, will be provided with similar reference designations, where possible. Specific language will be used herein to describe the exemplary embodiments. Nevertheless, it will be understood that no limitation of the scope of the disclosure is thereby intended. Rather, it is to be understood that the language used to describe the exemplary embodiments is illustrative only and is not to be construed as limiting the scope of the disclosure (unless such language is expressly described herein as essential).

Any headings used herein are for organizational purposes only and are not meant to be used to limit the scope of the description or the claims.

Various aspects of the present disclosure can be illustrated by describing components that are bound, coupled, attached, connected, and/or joined together. As used herein, the terms "bound," "coupled", "attached", "connected," and/or "joined" are used to indicate either a direct association between two components or, where appropriate, an indirect association with one another through intervening or intermediate components. In contrast, when a component is referred to as being "directly bound," "directly coupled", "directly attached", "directly connected," and/or "directly joined" to another component, no intervening elements are present or contemplated. Furthermore, binding, coupling, attaching, connecting, and/or joining can comprise mechanical and/or chemical association.

Exemplary Salt-Water Waste Destruction System

Embodiments of the present disclosure enable the collection of plastic waste from the ocean and other large bodies of water, including salt water. The collection and destruction of plastic waste may take place wholly on water or out at sea by use of a barge or ship or other marine vessel which has been outfitted with means for waste collection.

Waste collection means may include nets, filters, buckets, and the like. In some embodiments, nets may be configured in a single layer and particularly sized to collect certain sized waste. For example, a net intended to pick up large waste may have larger holes to facilitate collection of waste at a faster pace by subsequently reducing drag. Alternatively, nets may have smaller holes to facilitate the collection of smaller plastics. In some embodiments the nets or filters may comprise multiple layers, wherein the first layer to come into contact with waste may have large holes to collect large waste in a first layer. The second layer following the larger first layer may have smaller holes to collect medium or small waste which is small enough to filter through the first layer. Additional layers may be added in this manner. Each layer of netting may be spaced far enough from the other net layers to provide space for the waste to collect on the net. In some situations, it may be advantageous to separate waste by size, for example, some sized plastics may be retained and utilized in recycled products, while remaining waste may be destroyed. Nets may be dragged by a marine vessel on or near the water surface where most plastic debris accumulate.

In some embodiments, a marine vessel may incorporate the use of a pump or vacuum to suction or draw in water containing waste. The marine vessel may be outfitted with a net or filter system which may provide for the drawn water containing waste to pass through the net, wherein waste is collected on the net and filtered water is returned back to the ocean, sea, or body of water from which it came.

Once the waste is collected from the body of water, it may be sorted if any of it is to be recycled into manufactured products. Remaining waste may then be fed directly into the waste destruction system.

Embodiments of the present disclosure enable a method for destroying ocean-collected plastic debris. Particularly, embodiments of the present disclosure incorporate salt and water to accelerate the degradation process. Embodiments of the present disclosure utilize a fluidizable media and salt-water coated waste to accelerate the destruction of plastic waste or other marine debris. These destruction systems allow for the fast and complete destruction of plastic waste or other marine debris without the need for added chemicals or high temperature incineration. Beneficially, embodiments of the present disclosure enable a fast, simple, easy, and systematic method of waste or marine debris destruction that requires less energy input than conventional destruction systems.

These embodiments can be implemented both on land and on vessels at sea, though out at sea or on a body of water may be preferable to eliminate the need to collect and transport waste to land before it can be disposed of. These embodiments can also be resized and adapted to allow for portability and use in small spaces, i.e. smaller marine vessels. It may be advantageous for the collected waste to be moved directly to the waste destruction system without allowing the waste to dry. The moisture and salt contained on the waste, e.g. salt-coated waste, effectively speeds up the reaction with the fluidizable media in the waste destruction system to provide for cleaner, and more efficient destruction of plastic waste.

Figure 1:
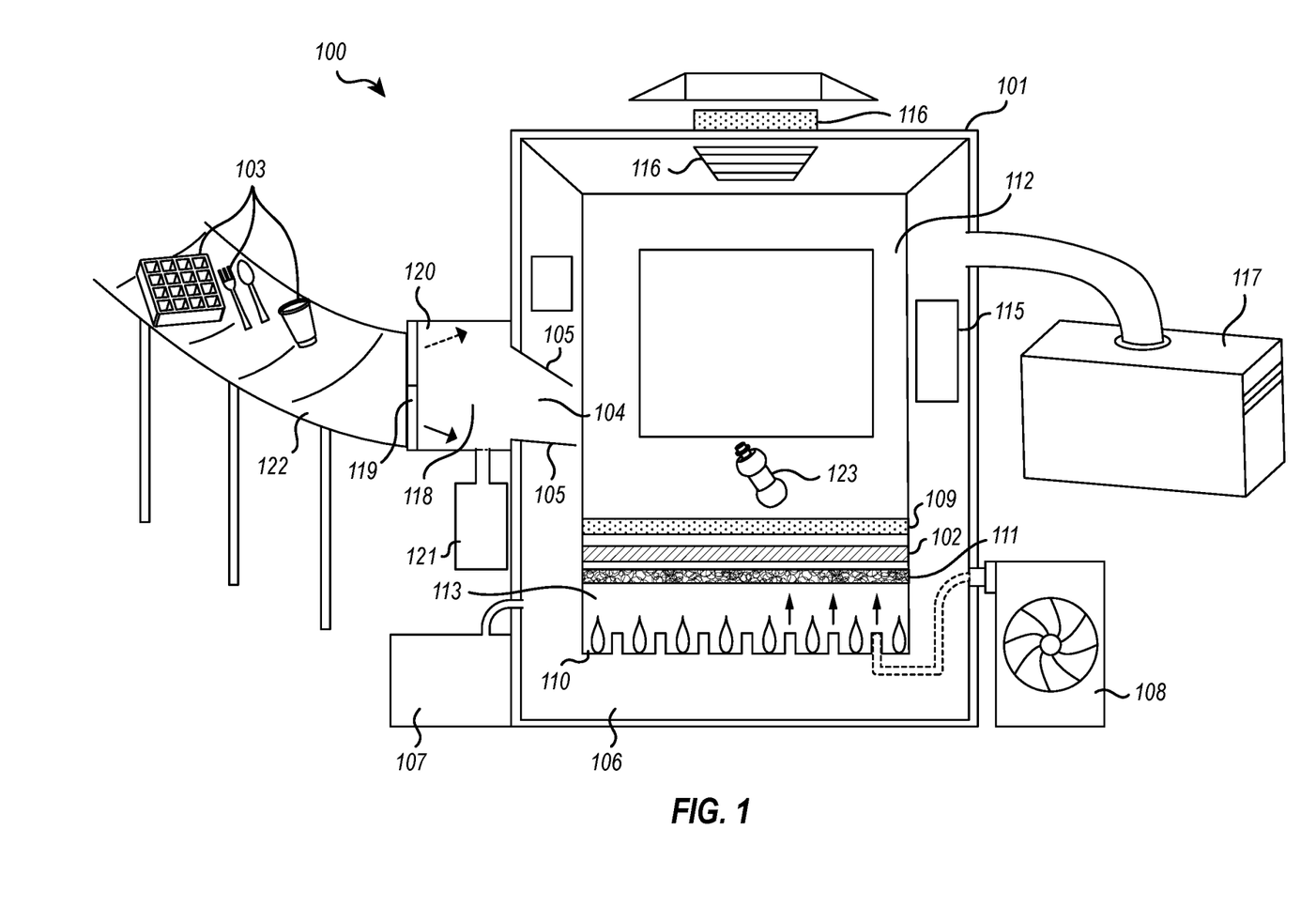
FIG. 1 illustrates a waste destruction system according to one or more embodiments of the present disclosure.

FIG. 1, for example, illustrates an exemplary waste destruction system 100 of the present disclosure. As illustrated in FIG. 1, the waste destruction system 100 includes an insulated chamber 101 containing a fluidizable media 102 capable of generating highly reactive oxidants to carry out the complete destruction of salt-coated waste 103. The insulated chamber 101 may include an opening 104 through which salt-coated waste 103 may be introduced into the insulated chamber 101. The opening may include a door 105 in the form of a hatch, a gate, or the like, configured to maintain a fixedly removable seal over the opening 104. The insulated chamber 101 may further include a base 106, a heat source 107, an air source 108, and a support tray 109 configured for supporting the salt-coated waste 103 at a distance above the fluidizable media 102. The area above the support tray 109 may comprise a receiving space 112. The receiving space 112 may be characterized as a space providing room for the salt-coated waste 103 to collect in the insulated chamber 101 before it is destroyed.

The base 106 may comprise the bottom of the insulated chamber 101. In some embodiments, the base 106 may contain the heat source 107 and/or the air source 108. In other embodiments, the heat source 107 and/or the air source 108 may be situated externally to the insulated chamber 101. In cases where the heat source 107 and/or air source 108 are situated externally to the insulated chamber 101, the base 106 may be configured to receive heat and forced air from their respective sources 107, 108, and deliver the heat and forced air into the insulated chamber 101. The base 106 may further include a top surface 110, wherein the top surface 110 comprises a series of holes, portals, valves, pipes or the like, through which heat and forced air may be directed into the insulated chamber 101.

In some embodiments, an air diffuser 111 may be situated directly on top of the top surface 110 of the base 106. In other embodiments, the air diffuser 111 may be situated at a distance above the top surface 110 of the base 106. The distance between the air diffuser 111 and the top surface 110 may provide a void space 113 where the heat and forced air may mix before the continuous flow of heat and forced air causes the warmed air to rise through the air diffuser 111 and into the fluidizable media 102. In some embodiments the air diffuser 111 may be configured to only allow the upward flow of forced air from the base 106 into the fluidizable media 102 and receiving space 112, while in other embodiments cooled air may be allowed to flow back down through the air diffuser into the void space 113 so that it can be reheated.

The fluidizable media 102 preferably comprises sand-like particles of a catalytic material such as silica sand, silica gel, alumina, and the like. These materials and similar materials are preferred for their reactivity and their inexpensive nature. In some embodiments the fluidizable media 102 may comprise stone-like particles of small or large stones, or a mixture thereof. The fluidizable media 102 need only be as thick as is necessary to produce the needed concentration of reactive hydroxyl radicals in the insulated chamber 101. The fluidizable media may have a height of 0.5 inches to 1.5 feet, or from 1 inch to 1.25 feet, or from 2 inches to 1 foot, or from 3 inches to 8 inches, or from 3.5 inches to 7 inches. The fluidizable media 102 may rest on top of a bed 114. The bed 114 may be situated at a distance above the top surface 110 of the base 106 in the bottom of the insulated chamber 101. In embodiments which incorporate an air diffuser 111, the bed 114 containing the fluidizable media 102 may be situated directly on top of the air diffuser 111, or at a distance above the air diffuser 111. The bed 114 may be configured to allow heated air to activate the fluidizable media 102 contained on the bed surface, while simultaneously preventing the fluidizable media 102 from falling into the base 106 and interfering with the flow of forced air and heat. This may be achieved through apertures in the bed 114, or through beds of varying shapes.

Figure 2A:
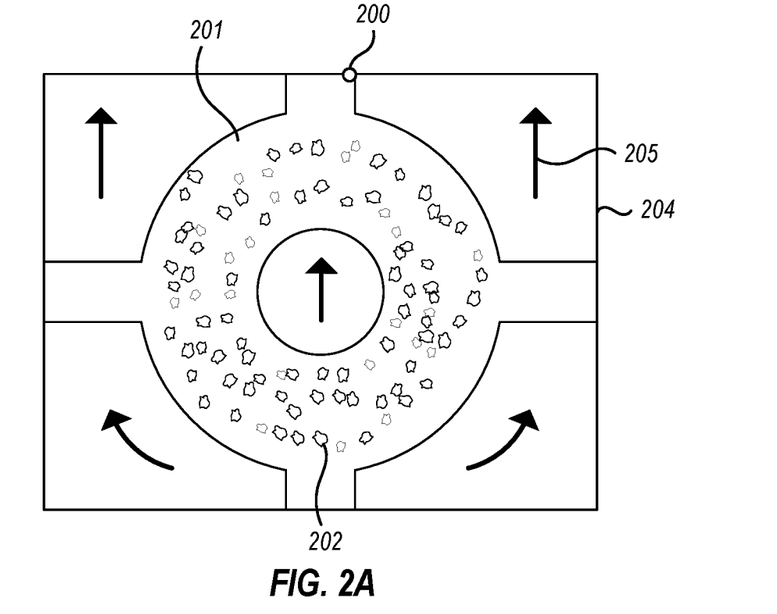
FIGS. 2A-2B illustrates a top perspective view of bed shapes for supporting fluidizable media according to one or more embodiments of the present disclosure.
Figure 2B:
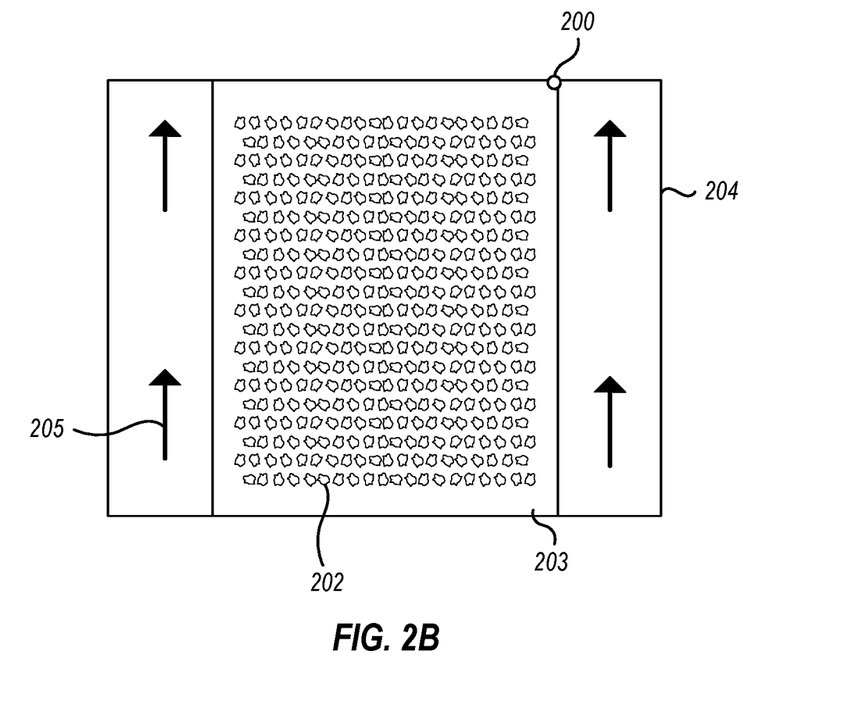

As shown in FIGS. 2A and 2B, in some embodiments, the bed 200 may form a ring 201 wherein the fluidizable media 202 is suspend in the ring 201 to allow heat and forced air 205 to pass through and around the ring 201. In other embodiments, the bed 200 may take the form of a pan 203 having a square or rectangular shape, attached to the walls of the insulated chamber 204, while leaving room to allow heat and forced air 205 to pass around the sides of the pan and heat the fluidizable media 202. Those of ordinary skill in the art will appreciate that a number of bed shapes beyond those described above can support fluidizable media, however, beds providing greater surface area to support a greater amount of fluidizable media may be preferred.

Returning to FIG. 1, in some embodiments the interior surface of the insulated chamber 101 may include one or more heat conduction panels 115. The heat conduction panels 115 may be made of any non-reactive, heat conducting material such as ceramic, and may help maintain a constant temperature within the insulated chamber 101. The heat conduction panels 115 may be placed as tiles on the interior surface. Alternatively, the heat conduction panels may comprise the entirety of the interior surface of the insulated chamber 101 enclosing the receiving space 112.

In some embodiments the door 105 may be a single panel configured to open when a force is applied and to return to its initial position upon termination of the applied of force. This effect may be achieved through use of springs, cables, hinges or the like which are configured to allow the force of light materials, such as small plastic waste, to cause the door 105 to open so the materials can enter the receiving space 112. In other embodiments the door 105 may comprise a double panel configuration. The door 105 may be configured to only open in a single direction to prevent the backflow of waste, debris, or other matter once it has been sent through the door 105. Alternatively, in some embodiments it may be beneficial to have a door 105 configured to open in both directions.

The insulated chamber 101 may include one or more vents 116. The one or more vents may be configured to be selectively opened or closed so that heat and hydroxyl radicals are contained within the insulated chamber 101 during the reaction period. When the reaction is complete, and the salt-coated waste 103 is destroyed, the one or more vents 116 may be opened to allow heat to escape. In some embodiments the one or more vents 116 may interface with a gas collection unit 117 which may be configured to neutralize any off-gasses produced during the reaction. The gas collection unit 117 may also filter any residual particulate matter that may have become airborne in the insulated chamber 101 during the reaction. The one or more vents 116 and the gas collection unit 117 may be connected via pipes, tubes, valves or similar structures.

A humidification compartment 118 encloses the external side of the door 105. The humidification compartment 118 may be sized to accommodate any volume of salt-coated waste 103 that can be effectively treated in the humidification compartment 118. The humidification compartment 118 comprises a compartment 120 with a panel opening 119 which may be selectively sealed during the humidification process. The compartment 120 itself may comprise the humidifier. In other embodiments, the compartment 120 may provide a space for humidified air to collect from an external humidifier 121. The humidifier may impart the salt-coated waste 103 with additional moisture before it is sent into the receiving space 112. In some embodiments, the salt-coated waste loses moisture after collection and requires added moisture to efficiently react with the fluidizable media 102.

When silica and/or alumina are properly activated in the presence of heat and moisture, they produce a reactive atmosphere of highly reactive hydroxyl radicals, muons and/or other reactive species or molecular fragments, which are able to degrade waste materials. The salt-coated waste 103 may be dried or wet when it is introduced to the waste destruction system 100, though it is advantageous if the salt-coated waste is drawn directly from a body of water and still wet when it enters the waste destruction system. If the salt-coated waste becomes dry for any reason, e.g. collection in a hot and/or dry environment, or the waste is stored for a period of time on a marine vessel before it is introduced into the waste destruction system, the humidification compartment 118 will impart the salt-coated waste 103 with additional moisture to enhance the speed of the reaction. The vaporized water imparted through the humidification process increases the moisture content in the reaction chamber and speeds up the rate of reaction. Vaporized water produced by humidification may be beneficial over simply drenching salt-coated waste 103 in a liquid because the vaporized water molecules are able to more efficiently attach and/or absorb into the waste, imparting it with a higher water content and activating the salts contained therein. The vaporized water particles enable saturation of the waste to impart moisture while not diluting or washing away necessary salts.

A waste introduction unit 122 may be attached to the distal side of the humidification compartment 118. The waste introduction unit 122 may take the form of a chute, ramp, or conveyor belt, or the like. Salt-coated waste 103 may be manually forced through the waste introduction unit 122 or it may be done by machine. The waste introduction unit 122 may be sloped or angled downward towards the humidification compartment 118 to allow salt-coated waste 103 to be introduced into the humidification compartment 118. The panel opening 119 of the humidification compartment 118 may be configured to open automatically upon activation of the humidification process to allow salt-coated waste 103 to fill the compartment 120. The compartment 120 may have one or more sensors to detect the weight and/or volume of waste inside the compartment 120, which may in turn trigger the panel opening 119 to close once the weight or volume maximum for the compartment 120 has been reached. In some embodiments, sensors within the compartment 120 may be configured to detect the initial moisture content of the salt-coated waste 103 in order to adjust the amount of heat and/or water needed to achieve the desired level of humidification. Once the humidification process is complete, the sensors may trigger the door 105 to open to allow the humidified salt-coated waste 123 to enter the receiving space 112.

Figure 3:
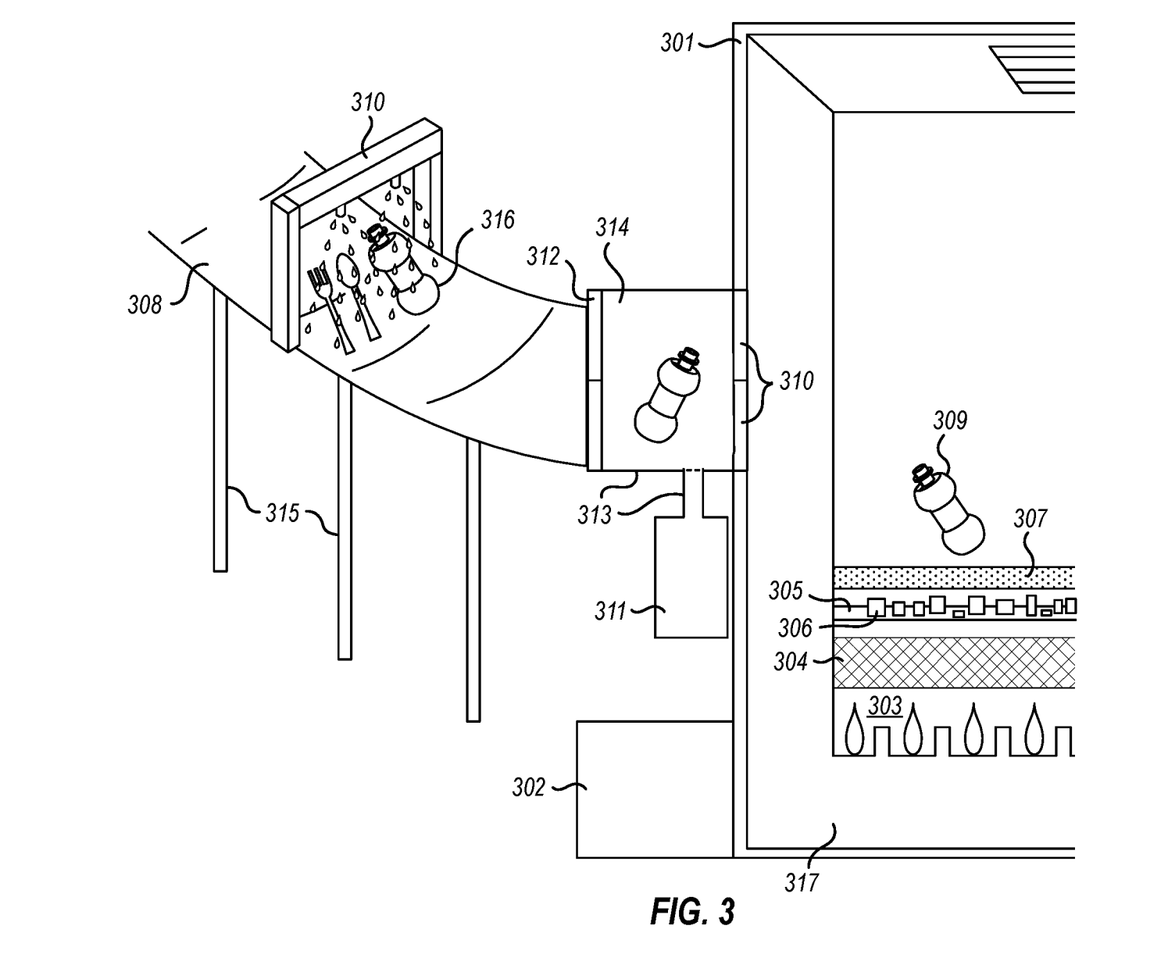
FIG. 3 illustrates a waste destruction system including a salt wash station according to one or more embodiments of the present disclosure.

As illustrated in FIG. 3, the waste destruction system includes an insulated chamber 301 containing a fluidizable media 306 capable of generating highly reactive oxidants to carry out the complete destruction of salt-coated waste 316. The insulated chamber 301 may include a base 317, a heat source 302, and a support tray 307 configured for supporting the salt-coated waste 316 at a distance above the fluidizable media 306. The area above the support tray 307 may include a receiving space characterized as providing room for the waste 309 to collect in the insulated chamber 301 before it is destroyed. The fluidizable media 306 may rest on top of a bed 305. The bed 305 may be situated at a distance above a top surface 303 of the base 317 in the bottom of the insulated chamber 301. In some embodiments, the insulated chamber 301 includes an air diffuser 304. In embodiments which incorporate an air diffuser 304, the bed 305 containing the fluidizable media 306 may be situated directly on top of the air diffuser 304, or at a distance above the air diffuser 304. The bed 305 may be configured to allow heated air to activate the fluidizable media 306 contained on the bed surface, while simultaneously preventing the fluidizable media 306 from falling into the base 317 and interfering with the flow of forced air and heat. This may be achieved through apertures in the bed 305, or through beds of varying shapes (see, for example, FIG. 2).

In some embodiments, the waste introduction unit 308 may be situated on one or more supports 315 and incorporate at least one salt wash station 310. In some embodiments, there may be two salt wash stations 310. The salt wash station 310 may utilize a highly concentrated salt solution which may be sprayed on to the salt-coated waste 316 before it enters the humidification subsystem 313. In some embodiments, humidification subsystem 313 comprises an external humidifier 311 and a humidification compartment 314. The salt wash station 310 can incorporate a stationary spray device with one or more spray nozzles. In some embodiments the salt wash station may comprise handheld sprayers. The addition of salt unexpectedly enhances the reaction between the fluidizable media and the heat by increasing the speed at which the reaction takes place. The highly concentrated salt solution may be derived from the environment in which the waste destruction system is implemented. For example, if the waste destruction system is implemented in a coastal area, or on a marine vessel, salt may be collected from bodies of salt water (e.g., oceans) or from salt suspended in the air through a desalination or evaporation process. Brine waste from desalination plants may be used as a concentrated salt solution. By increasing the salt and water content in the insulated chamber 301, the reaction producing highly reactive hydroxyl radicals speeds up, decreasing the time it takes for the reaction to breakdown or destroy waste (e.g., marine debris) introduced into the insulated chamber 301. Additionally, the added salt helps to absorb water vapor from the humidification process onto the salt-coated waste, thereby causing the salt-coated waste to enter the insulated chamber 301 with more moisture, increasing the production of highly reactive hydroxyl radicals which in turn speeds up the reaction. The presence of salt removes the need for the addition of toxic chemicals. This, in turn, results in a cleaner plastic destruction process that requires less energy to maintain.

Figure 4A:
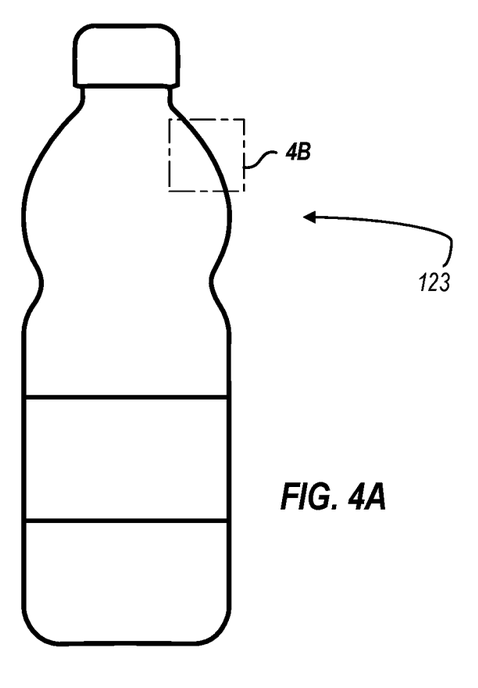
FIG. 4A illustrates salt-coated plastic waste to be destroyed according to one or more embodiments of a disclosed waste destruction system.
Figure 4B:
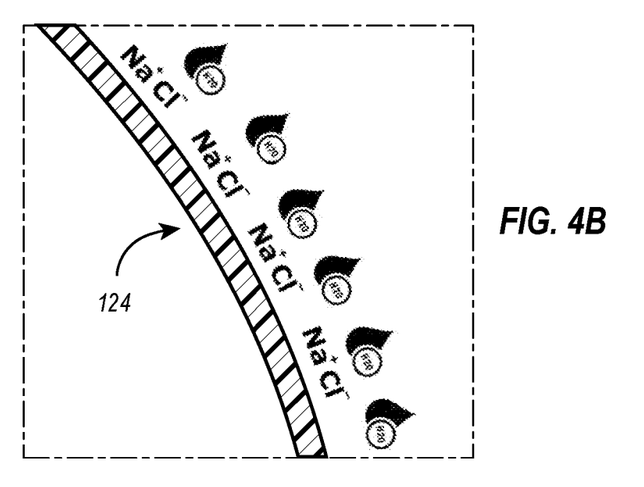
FIG. 4B illustrates a close-up view of a boundary of the salt-coated plastic waste of FIG. 4A.

FIGS. 4A and 4B illustrate salt-coated plastic waste, and a close-up view, to be destroyed according to one or more embodiments of disclosed waste destruction systems. The illustrated salt-coated plastic waste 123 is a plastic water bottle, though any salt-coated plastic waste will have similar characteristics as those described. As shown in FIG. 4B, the salt-coated plastic waste 123 has a boundary 124. Only a portion of the boundary 124 is illustrated in FIG. 4B, though it is to be understood that the entire salt-coated plastic waste 123 has a boundary 124. An outer surface of the boundary 124 is coated with salt molecules (depicted as $Na^+Cl^-$). FIG. 4B illustrates sodium chloride salt, though any other salt found in oceans, seas or other bodies of water will accord similar benefits, such as salts of potassium, magnesium, calcium, etc. The salt molecules form a sort of film on the outer surface of the boundary 124 and, because they are hygroscopic, attract water molecules locally to the outer surface of the boundary 124.

When salt-coated plastic waste 123 is pulled from its respective body of water, some of the water drips back into the body from whence it came. As outlined above, the presence of water and/or humidity beneficially speeds up the destruction of waste and other marine debris. The salt film formed on the outer surface of the boundary 124 retains this valuable moisture on the outer surface of the salt-coated plastic 123. The salt film formed on the outer surface of the salt-coated plastic waste 123 beneficially brings with it a finite amount of extra water molecules. This finite amount of extra water surprisingly increases the production of hydroxyl radicals and aids the degradation of salt-coated wastes. Furthermore, by increasing the production of hydroxyl radicals and degrading salt-coated waste, the addition of salt and water beneficially preserves the self-sustaining nature of the reaction inside the waste destruction systems, such as that depicted in FIGS. 1 & 3.

As outlined above, the fluidizable media contained inside the insulated chamber of a waste destruction system creates a highly reactive environment upon the introduction of heat and airflow. This highly reactive environment degrades salt-coated waste when it is introduces into the insulated chamber. As the salt-coated waste is degraded it generates heat that contributes to maintaining the highly reactive environment. This may be a self-sustaining, iterative cycle. By beneficially speeding up the degradation, the addition of salt and water speeds up this generation of heat, which then leads to a further increase in the rate of degrading salt-coated waste. Other aspects of a self-sustaining reaction are described in U.S. patent application Ser. No. 14/996,084 to Thomas C. Maganas filed Jan. 14, 2016, the contents of which are incorporated herein by reference.

In one embodiment, the present disclosure includes methods for the complete destruction of marine debris. Such destruction is carried out without the need for high temperature incineration. Instead, the present disclosure utilizes a waste destruction system as described herein that includes an insulated chamber containing a support tray for maintaining humidified salt-coated waste at a distance above the fluidizable media. A reactive atmosphere can be generated using a fluidizable bed of catalytic particles such as silica, alumina, and the like. The method of destroying marine debris can be performed as described herein by placing the waste on a support tray within the insulated chamber above the fluidized bed. Performing the method may also include supplying heat and/or air flow to the fluidized bed so that the resulting gasses formed through the reaction of the catalytic particles with heat and air can substantially degrade and destroy the waste.

Furthermore, while the use of fluidizable media to produce gasses to achieve a reactive atmosphere is known in the art, it was unexpected that incorporating wet, salt-coated waste would speed up the rate of the catalytic reaction to increase the speed of decomposition of materials placed in the insulated chamber.

In some embodiments, a salt wash station is incorporated into a waste introduction unit preceding the humidification compartment. The salt wash station may be used to apply a highly concentrated salt solution to waste to increase the amount of salt in the insulated chamber, thereby speeding up the reaction. This may be particularly useful in situations where waste is removed from bodies of water having lower salt concentrations, or in situations where there is lag time between the removal of waste from a body of water on to a marine vessel, and when the waste is actually introduced into the waste destruction system. In some embodiments the salt wash station may follow directly after the humidification compartment, but directly before the waste is moved to the insulated chamber. (See FIG. 3 depicting two salt wash stations 310).

A feature of the present disclosure is to provide methods and systems for the complete destruction of plastic waste and associated waste typically found in bodies of water, particularly salt water. Another feature of the present disclosure is to speed up the rate at which plastics and other slow-to-degrade waste can be disposed of through the use of a fluidized bed containing catalytic media exposed to heat in the presence of increased salt and moisture.

Once the waste is introduced into the insulated chamber, the heat source and the air source are activated to begin the reaction involving the fluidizable media. In some embodiments, the reaction may begin before the waste is introduced into the insulated chamber to first create the reactive atmosphere in order to shorten the amount of time needed for the destruction process. When the temperature in the chamber reaches the desired reaction temperature, the heat source may be turned off, manually or automatically.

During the disposal reaction, the waste may emit enough energy in the form of heat to maintain the reaction temperature without an added heat source. In some embodiments, heat retention panels may partially cover or fully cover the interior walls of the insulated chamber to aid in maintaining a constant and/or desired temperature in the insulated chamber in the absence of an outside heat source. Because the air flow source is independent of the heat source, the air flow can continue in the absence of heat to circulate air in the insulated chamber. If air begins to cool below the desired reaction temperature, the heat source can be reinitiated to run until the desired temperature is achieved.

Figure 5:
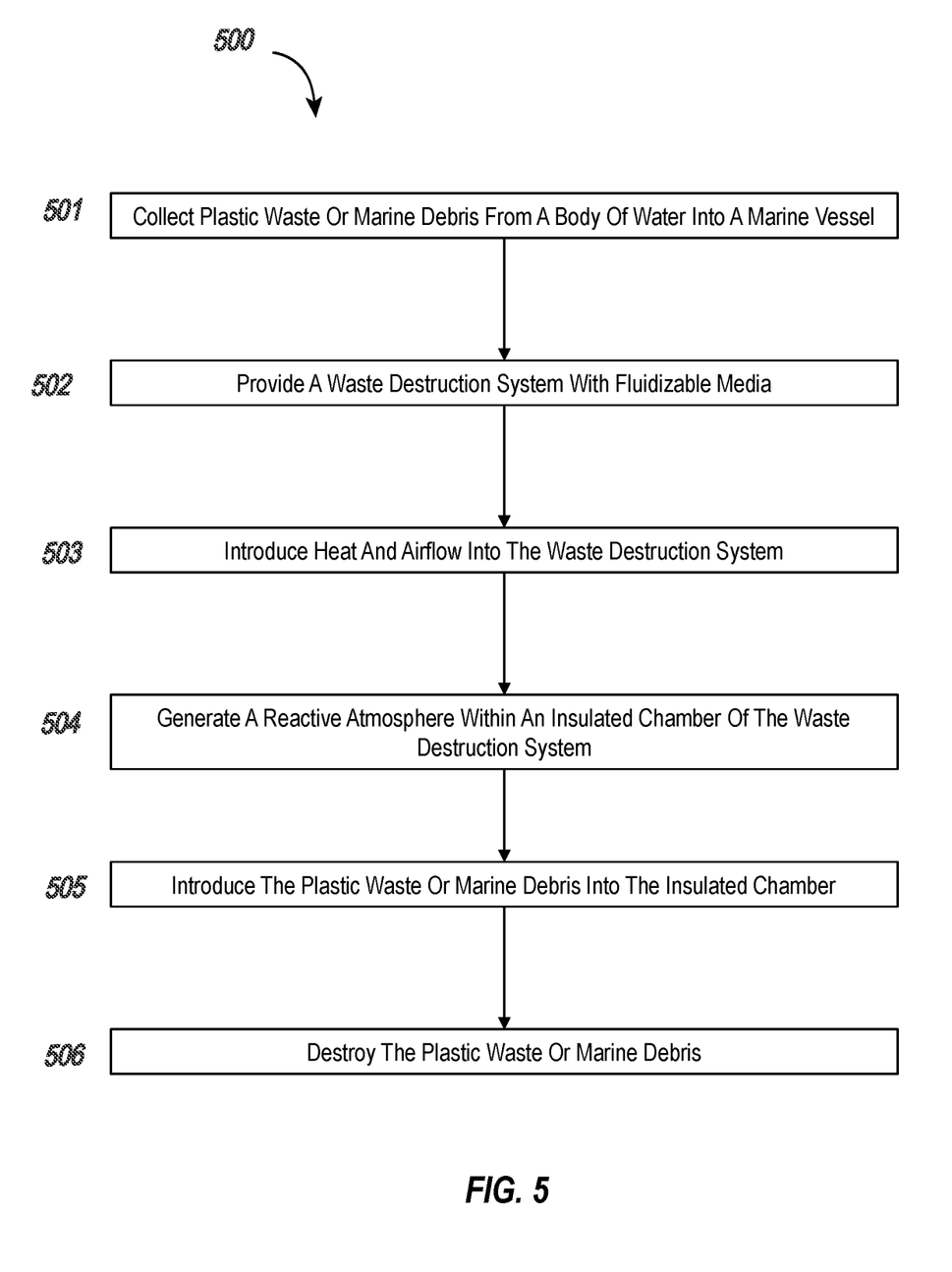
FIG. 5 is a flow chart illustrating an example method destroying plastic waste.

FIG. 5 illustrates a method of destroying salt-coated waste. The method 500 may include the collection of plastic waste or marine debris from a body of water into a marine vessel (step 501). The method may further include providing a waste destruction system with fluidizable media and introducing heat and airflow into the waste destruction system (steps 502, 503). The method may also include generating a reactive environment within an insulated chamber of the waste destruction system (step 504). The reactive environment may be generated by the introduction of heat and airflow into the fluidizable media of the waste destruction system. The method may also include the introduction of plastic waste or marine debris into the insulated chamber and destruction of the plastic waste or marine debris (steps 505, 506). Though not illustrated in FIG. 5, the method may include spraying the plastic waste or marine debris with a salt spray prior to, or simultaneously with, introducing the plastic waste or marine debris into the insulated chamber of the waste destruction system. The disclosed method enables fast, simple, easy, and systematic destruction of salt-coated waste or other marine debris. The disclosed method may be easily implemented on a variety of marine vessels and systematically repeated for efficient destruction of plastic waste. The disclosed method also enables cleaner and more efficient destruction of plastic wastes.

CONCLUSION

Various alterations and/or modifications of the inventive features illustrated herein, and additional applications of the principles illustrated herein, which would occur to one skilled in the relevant art and having possession of this disclosure, can be made to the illustrated embodiments without departing from the spirit and scope of the invention as defined by the claims, and are to be considered within the scope of this disclosure. Thus, while various aspects and embodiments have been disclosed herein, other aspects and embodiments are contemplated. While a number of methods and components similar or equivalent to those described herein can be used to practice embodiments of the present disclosure, only certain components and methods are described herein.

It will also be appreciated that systems, devices, products, kits, methods, and/or processes, according to certain embodiments of the present disclosure may include, incorporate, or otherwise comprise properties, features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatus disclosed herein may be made without departing from the scope of the disclosure or of the invention, which is defined in the appended claims. All changes which come within the meaning and range of equivalency of the claims are to be embraced within their scope.

What is claimed is:

1. An apparatus for waste destruction on a marine vessel, comprising:
    an insulated chamber situated on top of a base;
    a bed of a fluidizable media located within the insulated chamber and above the base comprised of a material that generates OH (hydroxyl) radicals in the presence of moisture and heat;
    a heat source in communication with the base and the insulated chamber for generation of hydroxyl radicals by the material for the destruction of waste;
    an air source in communication with the base and the insulated chamber configured to provide upward flow of forced air from a bottom of the bed of the fluidizable media within the insulated chamber;
    a support tray positionable within the insulated chamber above the bed of the fluidizable media, the support tray being configured to hold and retain a salt-coated waste adjacent to the fluidizable media during the destruction thereof;
    a receiving space above the support tray for collection of the salt-coated waste;
    a humidification compartment in fluid communication with an opening of the insulated chamber,
        wherein the opening is covered by a door, the door selectively isolating the humidification compartment from the insulated chamber; and
        wherein the humidification compartment has a distal end and a proximal end, wherein the distal end is selectively covered by a panel; and
    a waste introduction unit in fluid communication with the distal end of the humidification compartment.

2. The apparatus as in claim 1, further comprising an air diffuser positioned above the air source and below the bed of the fluidizable media.

3. The apparatus as in claim 2, wherein the apparatus includes a void space between the base and the air diffuser.

4. The apparatus as in claim 1, wherein the air source is located outside of the base while remaining in communication with the base.

5. The apparatus as in claim 1, wherein the heat source is located outside of the base while remaining in communication with the base.

6. The apparatus as in claim 5, wherein the heat source is configured to provide heat from natural gas.

7. The apparatus as in claim 1, wherein the base has a surface with a plurality of apertures through which heat from the heat source and forced air from the air source may enter into the insulated chamber.

8. The apparatus as in claim 1, wherein the insulated chamber further comprises one or more heat conduction panels.

9. The apparatus as in claim 8, wherein the one or more heat conduction panels are made of ceramic.

10. The apparatus as in claim 1, wherein the insulated chamber further comprises one or more selectively closeable vents.

11. The apparatus as in claim 1, further comprising a gas collection device in fluid communication with the insulated chamber and configured to collect and process emissions resulting from the destruction of waste.

12. The apparatus as in claim 1, wherein the bed is shaped to hold the fluidizable media while allowing heat and air to pass up and through the bed of the fluidizable media.

13. An apparatus for waste destruction on a marine vessel, comprising:
    an insulated chamber situated on top of a base;
    a bed of a fluidizable media located within the insulated chamber and above the base comprised of a material that generates OH (hydroxyl) radicals in the presence of moisture and heat,
        wherein the fluidizable media comprises silica or alumina;
    a heat source in communication with the base and the insulated chamber for generation of hydroxyl radicals by the material for the destruction of waste;
    an air source in communication with the base and the insulated chamber configured to provide upward flow of forced air from a bottom of the bed of the fluidizable media within the insulated chamber;

a support tray positionable within the insulated chamber above the bed of the fluidizable media, the support tray being configured to hold and retain a salt-coated waste adjacent to the fluidizable media during the destruction thereof;

a receiving space above the support tray for collection of the salt-coated waste;

a humidification compartment in fluid communication with an opening of the insulated chamber,
  wherein the opening is selectively covered by a door, the door selectively isolating the humidification compartment from the insulated chamber; and
  wherein the humidification compartment has a distal end and a proximal end, wherein the distal end is selectively covered by a panel;

a waste introduction unit in fluid communication with the distal end of the humidification compartment; and a salt wash station in fluid communication with the waste introduction unit, wherein the salt wash station is configured to apply a salt solution to waste to be destroyed.

14. The apparatus as in claim 1, wherein the fluidizable media comprises at least one of silica or alumina.

15. The apparatus as in claim 13, wherein the heat source is configured to provide heat from fossil fuel.

16. The apparatus as in claim 13, wherein the apparatus is configured to turn off the heat source when the destruction of waste generates sufficient heat to sustain the generation of hydroxyl radicals by the catalytic material without input of external heat.

17. An apparatus for waste destruction on a marine vessel in the ocean, comprising:

an insulated chamber;

a bed of fluidizable media in the insulated chamber, the fluidizable media comprising a catalytic material that generates OH (hydroxyl) radicals in the presence of moisture and heat;

a heat source in communication with the fluidizable media for generation of hydroxyl radicals by the catalytic material for the destruction of waste recovered from the ocean;

an air source in communication with the bed configured provide upward flow of forced air through the bed of fluidizable media;

a support tray positionable within the insulated chamber above the bed of fluidizable media and configured to hold and retain waste recovered from the ocean adjacent to the bed of fluidizable media during the destruction thereof;

a receiving space above the support tray for receiving waste recovered from the ocean;

a humidification compartment in fluid communication with the insulated chamber, wherein the humidification compartment has a proximal end selectively isolatable from the insulated chamber by a door and a distal end selectively coverable by a panel; and a waste introduction unit in fluid communication with the distal end of the humidification compartment and selectively isolatable from the humidification compartment by the panel.

18. The apparatus as in claim 17, wherein the heat source is configured to provide heat from fossil fuel.

19. The apparatus as in claim 17, wherein the apparatus is configured to turn off the heat source when the destruction of waste generates sufficient heat to sustain the generation of hydroxyl radicals by the catalytic material without input of external heat.

20. The apparatus as in claim 17, further comprising a gas collection device in fluid communication with the insulated chamber and configured to collect and process emissions resulting from the destruction of waste.

* * * * *